US012766655B2

(12) United States Patent
Desai et al.

(10) Patent No.: US 12,766,655 B2
(45) Date of Patent: Oct. 20, 2026

(54) METHODS AND SYSTEMS FOR REAL TIME ESTIMATION OF PRESSURE CHANGE REQUIREMENTS FOR ROTARY CUTTERS

(71) Applicant: Tata Consultancy Services Limited, Mumbai (IN)

(72) Inventors: Saurabh Jaywant Desai, Pune (IN); Shashank Agarwal, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 572 days.

(21) Appl. No.: 18/049,358

(22) Filed: Oct. 25, 2022

(65) Prior Publication Data

US 2023/0211447 A1 Jul. 6, 2023

(30) Foreign Application Priority Data

Dec. 31, 2021 (IN) ............................ 202121062051

(51) Int. Cl.
*B23Q 17/09* (2006.01)

(52) U.S. Cl.
CPC ...... *B23Q 17/0904* (2013.01); *B23Q 17/0995* (2013.01); *B23Q 2717/00* (2013.01)

(58) Field of Classification Search
CPC ........... B23Q 17/0904; B23Q 17/0995; B23Q 2717/00; B23Q 17/0957; G05B 23/0224;
(Continued)

(56) References Cited

U.S. PATENT DOCUMENTS 6,418,828 B1 * 7/2002 Kalnitz ................ B26D 7/2628 83/699.61
8,781,982 B1 7/2014 Das et al.
(Continued)

FOREIGN PATENT DOCUMENTS

CN 111633467 A 9/2020

OTHER PUBLICATIONS

Abellan-Nebot, J.V., Romero Subirón, F. A review of machining monitoring systems based on artificial intelligence process models. Int J Adv Manuf Technol 47, 237-257 (2010). https://doi.org/10.1007/s00170-009-2191-8 (Year: 2010).*
(Continued)

*Primary Examiner* — Huy Q Phan
*Assistant Examiner* — Martin Walter Braunlich
(74) *Attorney, Agent, or Firm* — Finnegan, Henderson, Farabow, Garrett & Dunner, LLP

(57) ABSTRACT

Rotary knifes/cutters play an important role in manufacturing of finished products. The rotary cutters tend to lose their cutting material over time. Hence to compensate, pressure applied by cylinder over rotary cutter needs to be changed. But this change in pressure needs to be optimum as too high pressure can lead to loss of material and too low pressure can stop cutting operation. Present application provides methods and systems for real time estimation of pressure change requirements for rotary cutters. The system first determines minimum and maximum usage limit for rotary cutter based on historical rotary cutter usage data and real-time pressure value using first trained model. The system, upon determining that minimum usage limit is reached, determines time for next pressure change based on physical parameters using second trained model. Thereafter, system compares estimated time with estimated maximum usage limit and displays notification to change pressure based on comparison.

12 Claims, 6 Drawing Sheets

(58) Field of Classification Search
CPC ...... G05B 23/0283; G05B 2219/37252; G05B 2219/50185; G05B 2219/37258; G05B 19/4065; G05B 13/04; G05B 2219/34477; B26D 5/00; B26D 1/00; B26D 3/00; B26D 7/00; B26D 2210/00; B26D 9/00; B26D 11/00; B26D 1/12
See application file for complete search history.

(56) References Cited

U.S. PATENT DOCUMENTS

| | | | | |
|---|---|---|---|---|
| 10,739,230 | B2 | 8/2020 | Liao et al. | |
| 11,667,000 | B2 * | 6/2023 | Rempfler | B26D 7/2614<br>483/9 |
| 11,707,859 | B2 * | 7/2023 | Sakaishi | B23D 25/02<br>83/331 |
| 12,036,761 | B2 * | 7/2024 | De Franceschi | B31B 50/20 |
| 12,330,329 | B2 * | 6/2025 | Schomber, Jr. | B26F 1/38 |
| 12,564,911 | B2 * | 3/2026 | Inagaki | B23Q 17/0995 |
| 2022/0314481 | A1 * | 10/2022 | Schomber, Jr. | B26F 1/384 |

OTHER PUBLICATIONS

Bao Jinsonga et al., "A Data Driven Model for Predicting Tool Health Condition in High Speed Milling of Titanium Plates Using Real-Time SCADA," Title of the item: Procedia, 2017, vol. 61, pp. 317-322, Elsevier, https://reader.elsevier.com/reader/sd/pii/S2212827116313518?token=EB841A4C8C680504E75C76D8D2DFBAD287B25377F56B670B681381FBCF7009451E9BFD68B842EDEA189DC7CD287F3118&originRegion=eu-west-1&originCreation=20220818084602.

* cited by examiner

METHODS AND SYSTEMS FOR REAL TIME ESTIMATION OF PRESSURE CHANGE REQUIREMENTS FOR ROTARY CUTTERS

PRIORITY CLAIM

This U.S. patent application claims priority under 35 U.S.C. § 119 to: Indian Patent Application number 202121062051, filed on Dec. 31, 2021. The entire contents of the aforementioned application are incorporated herein by reference.

TECHNICAL FIELD

The disclosure herein generally relates to optimal utilization of rotary cutters, and, more particularly, to methods and systems for real time estimation of pressure change requirements for rotary cutters.

BACKGROUND

Rotary knifes/cutters plays an important role in the continuous manufacturing of finished products like diapers, sanitary pads, etc. They require periodic maintenance and need to be changed at regular intervals. Generally, the rotary cutters work in a very specific manner and are supported by a cylinder that imparts vertical force on the rotary knives, thus enabling them to optimally rest/touch the surface beneath where a free rotating anvil lies. The rotary cutters tend to lose their cutting material and sharpness over time due to usage. Hence to compensate for the same, pressure applied by the cylinder needs to be changed/increased manually. But this change/increase in pressure needs to be optimum as too high pressure can lead to loss of cutting material and too low pressure can stop the desired cutting operation.

However, as this pressure change requirement for cylinders is usually decided based on human judgement, it leads to some unplanned and sudden stoppage of the machine thus leading to wastage of operational time as well as the material. Further, as the pressure change is handled manually by human operators, it becomes necessary for the operators to have a good understanding of the pressure change requirement as the amount of pressure change at any step can have a great impact on the rotary cutter life, thereby putting stress on the operators to accurately handle/decide the pressure change requirement and the change in pressure.

Additionally, even though the operator may have a good understanding of the pressure change requirement, a manual operation sometimes lacks the exact update owing to pressure measurement and the update being analog in nature.

SUMMARY

Embodiments of the present disclosure present technological improvements as solutions to one or more of the above-mentioned technical problems recognized by the inventors in conventional systems. For example, in one aspect, there is provided a processor implemented method for real time estimation of pressure change requirements for rotary cutters. The method comprises receiving, by a pressure change requirement estimation system (PCRES) via one or more hardware processors, (a) historical rotary cutter usage data associated with a rotary cutter, (b) a real-time pressure value applied on the rotary cutter and (c) historical data associated with each rotary cutter of a plurality of rotary cutters; estimating, by the PCRES via the one or more hardware processors, a minimum usage limit and a maximum usage limit for the rotary cutter at the real-time pressure value based, at least in part, on the historical rotary cutter usage data and the real-time pressure value using a first trained model; monitoring, by the PCRES via the one or more hardware processors, real-time rotary cutter usage data to determine whether the minimum usage limit has reached for the rotary cutter, wherein the real-time rotary cutter usage data is received in real-time from a machine comprising the rotary cutter; upon determining that the minimum usage limit has reached for the rotary cutter, estimating, by the PCRES via the one or more hardware processors, a time for a next pressure change based on one or more physical parameters of the rotary cutter using a second trained model, wherein the one or more physical parameters are determined based on the real-time rotary cutter usage data; comparing, by the PCRES via the one or more hardware processors, the estimated time with the estimated maximum usage limit for the rotary cutter; and displaying, by the PCRES via the one or more hardware processors, a message to a user of the machine based on the comparison, wherein the message comprises a notification to change the pressure applied on the rotary cutter within the estimated time.

In another aspect, there is provided a pressure change requirement estimation system for real time estimation of pressure change requirements for rotary cutters. The system comprises a memory storing instructions; one or more communication interfaces; and one or more hardware processors coupled to the memory via the one or more communication interfaces, wherein the one or more hardware processors are configured by the instructions to: receive (a) historical rotary cutter usage data associated with a rotary cutter, (b) a real-time pressure value applied on the rotary cutter and (c) historical data associated with each rotary cutter of a plurality of rotary cutters; estimate a minimum usage limit and a maximum usage limit for the rotary cutter at the real-time pressure value based, at least in part, on the historical rotary cutter usage data and the real-time pressure value using a first trained model; monitor real-time rotary cutter usage data to determine whether the minimum usage limit has reached for the rotary cutter, wherein the real-time rotary cutter usage data is received in real-time from a machine comprising the rotary cutter; upon determining that the minimum usage limit has reached for the rotary cutter, estimate a time for a next pressure change based on one or more physical parameters of the rotary cutter using a second trained model, wherein the one or more physical parameters are determined based on the real-time rotary cutter usage data; compare the estimated time with the estimated maximum usage limit for the rotary cutter; and display a message to a user of the machine based on the comparison, wherein the message comprises a notification to change the pressure applied on the rotary cutter within the estimated time.

In yet another aspect, there are provided one or more non-transitory machine-readable information storage mediums comprising one or more instructions which when executed by one or more hardware processors cause a method for real time estimation of pressure change requirements for rotary cutters. The method comprises receiving, by a pressure change requirement estimation system (PCRES) via one or more hardware processors, (a) historical rotary cutter usage data associated with a rotary cutter, (b) a real-time pressure value applied on the rotary cutter and (c) historical data associated with each rotary cutter of a plurality of rotary cutters; estimating, by the PCRES via the one or more hardware processors, a minimum usage limit and a maximum usage limit for the rotary cutter at the real-time pressure value based, at least in part, on the historical rotary cutter usage data and the real-time pressure value using a first trained model; monitoring, by the PCRES via the one or more hardware processors, real-time rotary cutter usage data to determine whether the minimum usage limit has reached for the rotary cutter, wherein the real-time rotary cutter usage data is received in real-time from a machine comprising the rotary cutter; upon determining that the minimum usage limit has reached for the rotary cutter, estimating, by the PCRES via the one or more hardware processors, a time for a next pressure change based on one or more physical parameters of the rotary cutter using a second trained model, wherein the one or more physical parameters are determined based on the real-time rotary cutter usage data; comparing, by the PCRES via the one or more hardware processors, the estimated time with the estimated maximum usage limit for the rotary cutter; and displaying, by the PCRES via the one or more hardware processors, a message to a user of the machine based on the comparison, wherein the message comprises a notification to change the pressure applied on the rotary cutter within the estimated time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
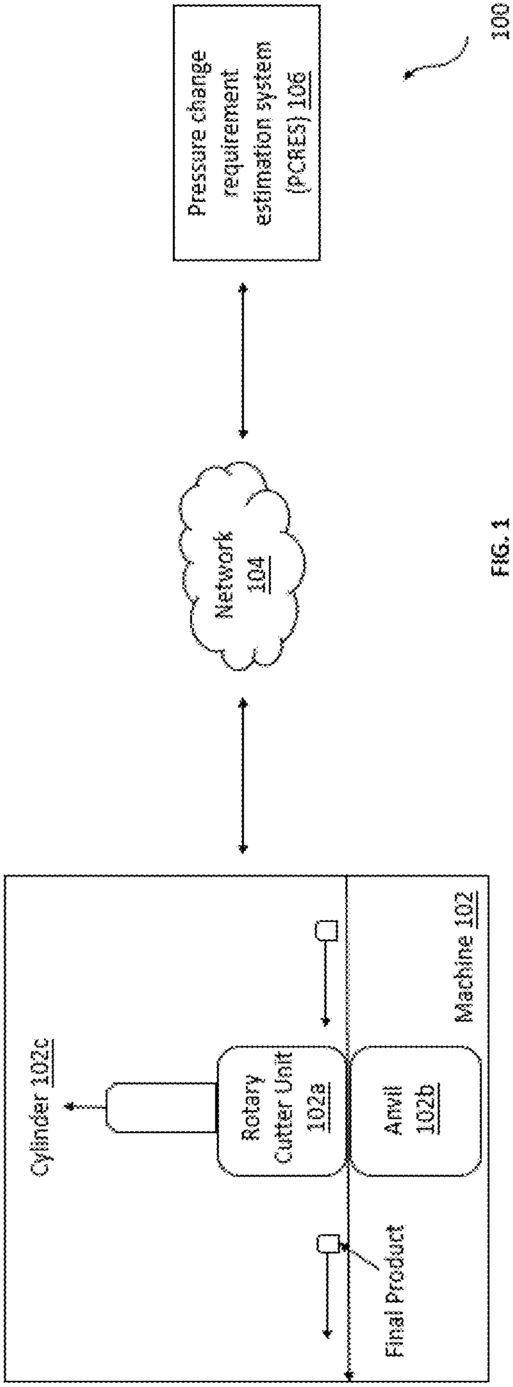
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The manufacturing industry, especially consumer packaged goods (CPG) industry is heavily dependent on rotary cutters. As discussed previously, rotary cutters tend to lose material and sharpness over its usage cycle. So, to make it work for a longer time, a cylinder is used to impart vertical force. The force (pressure) that is to be applied to the rotary cutters is usually measured using an analog scale and is changed manually by an operator based on his/her experience. Most of the times, the pressure change is made once the machine stops automatically as the rotary cutter cannot complete the cutting operation, thereby leading to wastage of operational time as well as the material which has to be discarded. Moreover, because of inefficient utilization of the rotary cutter, the rotary cutter loses its cutting efficiency early which further leads to increase in cost as the rotary cutter needs to be changed frequently for proper functioning of the machine.

Further, the systems that are available in the prior art for prolonging the life of rotary cutters works towards minimizing wear and tear losses during cutting process and wear and tear of the die used in the cutting process. However, handling the pressure change which is one of the important aspects is still not well handled by the systems available in the prior art.

Embodiments of the present disclosure overcome the above-mentioned disadvantages, like inefficient utilization, wastage of operational time and material, etc., by providing methods and systems for real time estimation of pressure change requirements for rotary cutters. More specifically, a pressure change requirement estimation system (also referred as system and interchangeably used herein) is provided by the present disclosure that uses a dual step prediction methodology to identify the pressure change requirement while considering both time of usage as well as physics-based signals. Once the pressure change requirement is identified, the system automatically verifies and calculates the exact pressure change requirement, thereby guiding the system to automatically update the pressure applied on the rotary cutters in real-time. Basically, the system automatically predicts the next rotary cutter pressure change time based on historical rotary cutter usage data and physical parameters of the rotary cutter and alerts a user/operator of the machine to change the pressure when it is due, thereby mitigating the need for human judgement that further helps in ensuring optimal utilization of the rotary cutters and higher productivity of the machine while reducing the wastage of the operational time and the material.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, time for a next pressure change estimation, next pressure value estimation, etc. The environment 100 generally includes a machine 102 comprising a rotary cutter and a pressure change requirement estimation system (PCRES) 106, each coupled to, and in communication with (and/or with access to) a network 104.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The machine 102 is a mechanical structure used in an industry to produce a particular product, such as sanitary pad, diaper etc. In an embodiment, the machine 102 includes a rotary unit in which a rotary cutter is embedded as per the specific usage requirement. The rotary unit further includes a rotary cutter unit 102*a*, an anvil 102*b*, and a cylinder 102*c*. The rotary cutter unit 102*a* is powered by an external drive motor and is configured to cut input raw material using the rotary cutter to produce the required product. The anvil 102*b* is a free rotating component where the rotary cutter unit 102*a* rest while performing its desired operation. The cutting inertia generated by the rotary cutter unit 102*a* while performing the operation makes the anvil 102*b* to rotate along with the rotary cutter unit 102*a*. The cylinder 102*c* is configured to impart vertical force/pressure onto the rotary cutter in an orthogonal direction of its operation.

The pressure change requirement estimation system (PCRES) 106 includes one or more hardware processors, and a memory. The PCRES 106 is configured to perform one or more of the operations described herein. The PCRES 106 is configured to receive historical rotary cutter usage data associated with the rotary cutter and a real-time pressure value applied on the rotary cutter from the machine 102 using the network 104. In an embodiment, the historical rotary cutter usage data includes discrete variables signifying object, such as number of sanitary pads quantity produced or continuous variables such as time wise pressure data, regrinding, number of times the rotary cutter has been used, manufacturer information etc. In one embodiment, the time wise pressure data include timing details when the pressure applied to the rotary cutter was changed. The PCRES 106 is also configured to receive historical data associated with each rotary cutter of a plurality of rotary cutters that was used by the machine 102 previously. In an embodiment, the historical data includes trends signifying loss of cutting property of each rotary cutter of the plurality of rotary cutters that can cause updating of the applied pressure.

The PCRES 106 is then configured to estimate a minimum usage limit and a maximum usage limit for the rotary cutter at the real-time pressure value based on the historical rotary cutter usage data and the real-time pressure value using a first trained model. Thereafter, the PCRES 106 is configured to monitor the real-time rotary cutter usage data to determine whether the minimum usage limit is reached for the rotary cutter. In an embodiment, the real-time rotary cutter usage data is received in real-time from the machine 102 using the network 104.

Further, upon determining that the minimum usage limit is reached for the rotary cutter, the PCRES 106 is configured to estimate a time for a next pressure change based on one or more physical parameters of the rotary cutter using a second trained model. In an embodiment, the one or more physical parameters are determined based on the real-time rotary cutter usage data that is collected in real-time from one or more sensors that are installed in the machine 102. The sensors basically collects operation related parameters such as current, speed etc. In case the minimum limit is yet to be reached for the rotary cutter, the machine 102 continues normal operation till the minimum usage limit is reached for the rotary cutter provided in the machine 102.

Once the estimated time for a next pressure change is determined, the PCRES 106 is configured to compare the estimated time with a predefined threshold i.e., the estimated maximum usage limit determined for the rotary cutter. If the estimated time crosses the predefined threshold, then a message is displayed to a user/an operator of the machine 102. In an embodiment, the message includes a notification to change the pressure applied on the rotary cutter within the estimated time. In case the estimated time is found to be within the predefined threshold, the PCRES 106 is configured to perform the next round of calculation for estimating time for next pressure change.

Additionally, the PCRES 106 is configured to determine an amount of pressure to be changed based on a rotary cutter usage index and the real-time pressure value. In an embodiment, the rotary cutter usage index is determined based on the historical rotary cutter usage data received from the machine 102. The historical rotary cutter usage data may include regrinding information, number of times the rotary cutter has been used, manufacturer information etc. Basically, the historical rotary cutter usage data dictates the required change in pressure at any point of time. The PCRES 106 is then configured to determine a next pressure value for the rotary cutter based on the determined amount of pressure to be changed and the real-time pressure value using a pre-defined pressure calculation formula. Thereafter, the PCRES 106 displays the next pressure value for the rotary cutter to the user of the machine 102.

In an embodiment, the user of the machine 102 may verify pressure update to decide whether to change the pressure applied on the rotary cutter or not. In another embodiment, the PCRES 106 may automatically update the pressure applied to the rotary cutter to the next pressure value. In one embodiment, the PCRES 106 may send one or more signals to one or more actuators installed on the machine 102 using the network 104 for updating the pressure applied to the rotary cutter to the next pressure value.

The number and arrangement of systems, containers, and/or networks shown in FIG. 1 are provided as an example. There may be additional systems, machines, and/or networks; fewer systems, machines, and/or networks; different systems, machines, and/or networks; and/or differently arranged systems, machines, and/or networks than those shown in FIG. 1. Furthermore, two or more systems shown in FIG. 1 may be implemented within a single system or device, or a single system or device shown in FIG. 1 may be implemented as multiple, distributed systems or devices. Additionally, or alternatively, a set of systems (e.g., one or more systems) of the environment 100 may perform one or more functions described as being performed by another set of systems of the environment 100 (e.g., refer scenarios described above).

Figure 2:
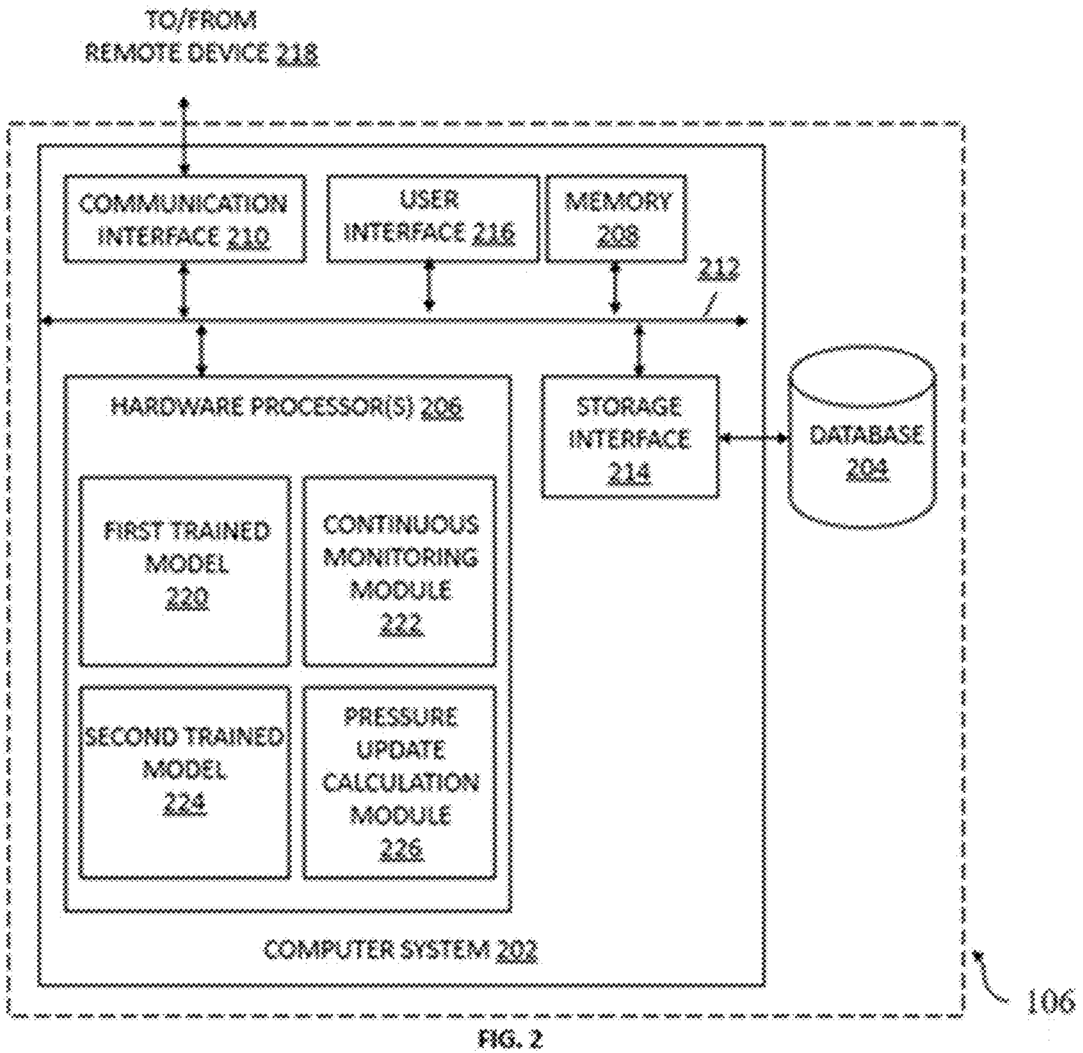
FIG. 2 illustrates an exemplary block diagram of a pressure change requirement estimation system for real time estimation of pressure change requirements for rotary cutters, in accordance with an embodiment of the present disclosure.

FIG. 2 illustrates an exemplary block diagram of a pressure change requirement estimation system (PCRES) 106 for real time estimation of pressure change requirements for rotary cutters, in accordance with an embodiment of the present disclosure. In an embodiment, the pressure change requirement estimation system 106 may also be referred as a system and may be interchangeably used herein. The system 106 is similar to the pressure change requirement estimation system (PCRES) 106 explained with reference to FIG. 1. In some embodiments, the system 106 is embodied as a cloud-based and/or SaaS-based (software as a service) architecture. In some embodiments, the system 106 may be implemented in a server system. In some embodiments, the system 106 may be implemented in a variety of computing systems, such as laptop computers, notebooks, hand-held devices, workstations, mainframe computers, and the like.

The PCRES 106 includes a computer system 202 and a database 204. The computer system 202 includes one or more processors 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the one or more processors 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the one or more processors 206 with access to the database 204.

In one embodiment, the database 204 is configured to store historical rotary cutter usage data associated with a rotary cutter and historical data associated with each rotary cutter of the plurality of rotary cutters. The database 204 is also configured to store predefined formulas, such as predefined pressure calculation formula and algorithms, such as polygon building algorithm and the like that may be used by the system 106 in real time estimation of the pressure change requirements.

The one or more processors 206 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 208.

The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the PCRES 106, as described herein. In another embodiment, the memory 208 may be realized in the form of a database server or a cloud storage working in conjunction with the PCRES 106, without departing from the scope of the present disclosure.

The one or more processors 206 are operatively coupled to the communication interface 210 such that the one or more processors 206 communicate with a remote device 218 such as, the machine 102, or communicated with any entity (for e.g., a machine learning/deep learning model) connected to the network 104. Further, the one or more processors 206 are operatively coupled to the user interface 216 for interacting with users, such as the user/operator of the machine 102 who is responsible for changing the pressure applied on the rotary cutter.

It is noted that the PCRES 106 as illustrated and hereinafter described is merely illustrative of an apparatus that could benefit from embodiments of the present disclosure and, therefore, should not be taken to limit the scope of the present disclosure. It is noted that the PCRES 106 may include fewer or more components than those depicted in FIG. 2.

In one embodiment, the one or more processors 206 includes a first trained model 220, a continuous monitoring module 222, a second trained model 224 and a pressure update calculation module 226.

The first trained model 220 includes suitable logic and/or interfaces for determining minimum and maximum time the rotary cutter can be used if it is operating at a particular pressure value. Basically, the first trained model 220 is trained to learn from the past usage of cutter i.e., from the historical rotary cutter usage data. The learning along with the real-time pressure value of the rotary cutter is then used by the first trained model 220 to estimate a minimum usage limit and a maximum usage limit for the rotary cutter at the real-time pressure value. In an embodiment, the first trained model 220 establishes a statistical range defining a minimum usage limit and a maximum usage limit of the rotary cutter at any given pressure value using the historical rotary cutter usage data. The historical rotary cutter usage data presents usage of the rotary cutter for each pressure value by the multiple values of parameters defining the usage of cutter. The statistical range is then used to determine the minimum usage limit and a maximum usage limit for the rotary cutter at the real-time pressure value.

In an embodiment, the continuous monitoring module 222 is in communication with the first trained model 220 and includes suitable logic and/or interfaces for monitoring real-time rotary cutter usage data received in real-time from the machine 102 to determine time when the minimum usage limit is reached for the rotary cutter. The continuous monitoring module 222 is also configured to determine time when the maximum usage limit is reached for the rotary cutter. In one embodiment, the continuous monitoring module 222 is configured to generate a message upon determining that the maximum usage limit is reached for the rotary cutter. The message may be displayed to the user of the machine 102 through the user interface 216. The message includes a notification to change the pressure applied on the rotary cutter within the estimated time.

The second trained model 224 is in communication with the first trained model 220 and the continuous monitoring module 222. The second trained model 224 includes suitable logic and/or interfaces for estimating a time for a next pressure change based on one or more physical parameters of the rotary cutter. The physical parameters can be quantified based on the real-time rotary cutter usage data that is gathered from the sensors defining operation related parameters such as current, speed etc.

The pressure update calculation module 226 is in communication with the second trained model 224 and the continuous monitoring module 222. The pressure update calculation module 226 includes suitable logic and/or interfaces for determining a rotary cutter usage index based on the historical rotary cutter usage data associated with the rotary cutter. In an embodiment, the historical rotary cutter usage data may include regrinding, number of times the rotary cutter has been used, manufacturer information, time details etc., which dictates the required change in pressure at any point of time. Mathematically, the rotary cutter usage index can be presented as:

Rotary cutter usage index=fn(Cutter regrinding cycle, manufacturer, material, usage cycle, time)

The pressure update calculation module 226 is also configured to calculate an amount of pressure to be changed (also referred as delta pressure) based on the rotary cutter usage index and the real-time pressure value. The calculated amount of pressure to be changed is then used by the pressure update calculation module 226 along with the real-time pressure value to calculate a next pressure value for the rotary cutter using a pre-defined pressure calculation formula represented as:

Next pressure value=Real time pressure value+Delta pressure

In one embodiment, the user interface 216 is configured to display the message to the user/operator of the machine 102. The user interface 216 is also configured to display the next pressure value for the rotary cutter to the user/operator.

Figure 3A:
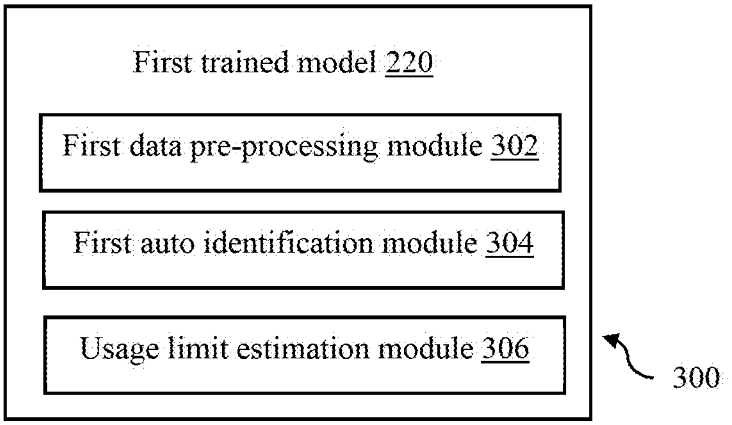
FIG. 3A illustrates a schematic block diagram representation of a first trained model associated with the system of FIG. 2 or the PCRES of FIG. 1 for real time estimation of pressure change requirements for rotary cutters, in accordance with an embodiment of the present disclosure.

FIG. 3A, with reference to FIGS. 1 and 2, illustrates a schematic block diagram representation 300 of the first trained model 220 associated with the system 106 of FIG. 2 or the PCRES of FIG. 1 for real time estimation of pressure change requirements for rotary cutters, in accordance with an embodiment of the present disclosure. In an embodiment, the first trained model 220 includes a first data pre-processing module 302, a first auto identification module 304, and a usage limit estimation module 306.

The first data pre-processing module 302 includes suitable logic and/or interfaces for receiving the historical rotary cutter usage data associated with the rotary cutter. The historical rotary cutter usage data includes one or more parameters such as discrete variables signifying object quantity produced and/or continuous variables such as time-wise pressure data. In one embodiment, the first data pre-processing module 302 is configured to categorize the parameters signifying the cutter usage over time. The first data pre-processing module 302 is also configured to filter out noise (i.e., irrelevant data) associated with the parameters to provide the pre-processed historical rotary cutter usage data.

The first auto identification module 304 includes suitable logic and/or interfaces for identifying one or more events on which the pressure value applied to the rotary cutter is changed based on the parameters included in the pre-processed historical rotary cutter usage data and the pressure values at which the rotary cutter is operated.

The usage limit estimation module 306 includes suitable logic and/or interfaces for establishing the statistical range defining a minimum usage limit and a maximum usage limit of the rotary cutter at any given pressure value using the pre-processed historical rotary cutter usage data and the one or more events. The established statistical range is then further used by the usage limit estimation module 306 to determine the minimum usage limit and a maximum usage limit for the rotary cutter at the real-time pressure value.

Figure 3B:
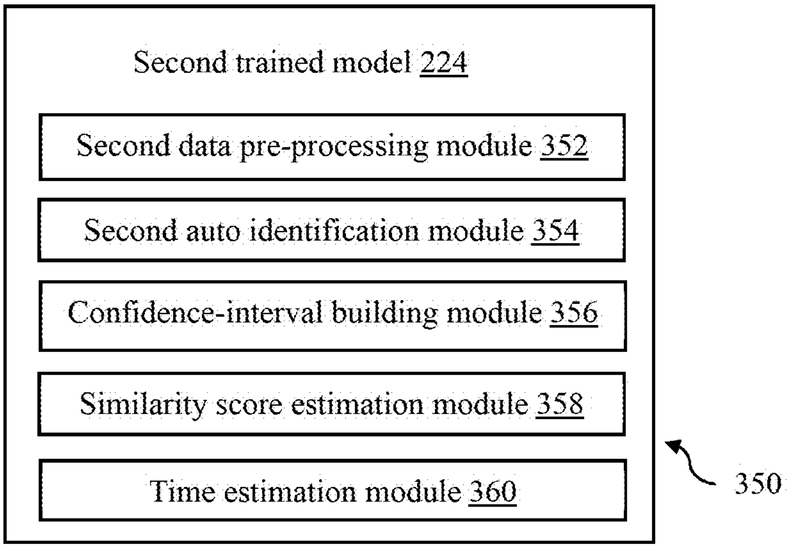
FIG. 3B illustrates a schematic block diagram representation of a second trained model associated with the system of FIG. 2 or the PCRES of FIG. 1 for real time estimation of pressure change requirements for rotary cutters, in accordance with an embodiment of the present disclosure.

FIG. 3B, with reference to FIGS. 1 and 2, illustrates a schematic block diagram representation 350 of the second trained model 224 associated with the system 106 of FIG. 2 or the PCRES of FIG. 1 for real time estimation of pressure change requirements for rotary cutters, in accordance with an embodiment of the present disclosure. In an embodiment, the second trained model 224 includes a second data pre-processing module 352, a second auto identification module 354, a confidence-interval building module 356, a similarity score estimation module 358, and a time estimation module 360.

The second data pre-processing module 352 is similar to the first data pre-processing module 302 discussed with reference to FIG. 3A. The second data pre-processing module 352 includes suitable logic and/or interfaces for extracting useful information i.e., estimate of pressure change from the real-time rotary cutter usage data associated with the rotary cutter. Basically, the real-time rotary cutter usage data includes the sensor signals that are received from the machine 102. The sensor signals are not directly usable as physical characteristic changes are usually minuscule and often not representative in their direct form. Further, the sensor data contains undesired noise, so actual pressure signal data fluctuates around the underlying applied pressure. So, to extract useful information, the sensor signals are filtered for further analysis. In an embodiment, the second data pre-processing module 352 may use any of the known filtering techniques, such as LOESS algorithm, STL etc., for performing filtering of the sensor data.

In an embodiment, the second data pre-processing module 352 is also configured to eliminate noise from the historical data associated with each rotary cutter of a plurality of rotary cutters to obtain pre-processed historical data.

The second auto identification module 354 is in communication with the second data pre-processing module 352. The second auto identification module 354 includes suitable logic and/or interfaces for automatically identifying events in which change in pressure is triggered by the user from the pre-processed historical data. Basically, the historical data is used by the system 106 to understand underlying trends that signify loss of cutting property of each rotary cutter of the plurality of rotary cutters and hence requires change in pressure. Hence, to understand the trend, the second auto identification module 354 identifies/marks the events which corresponds to the change in pressure automatically. As the second auto identification module 354 works on clean historical data i.e., the pre-processed historical data, the second auto identification module 354 can capture the actual change in pressure that is further marked as an event. Further, parameters of the machine changes with every step change in pressure. To compensate for the same, historical data of every equi-pressure window has to be extracted separately. So, the second auto identification module 354 performs pressure wise segregation of the pre-processed historical data for the complete cycle of each rotary cutter with respect to multi-pressure values to obtain the segregated data for the respective rotary cutter. For example, the pressure of the rotary cutter is changed to a new pressure, say, from 1.5 bar to 1.6 bar and the pressure is further changed from the new pressure to next new pressure, say, 1.6 bar to 1.7 bar. Thus, by knowing these two events, the data for desired pressure, say 1.6 bar can be gathered for all cutters in the database by the second auto identification module 354. It should be noted that the second auto identification module 354 uses few other machine signals also such as machine ramp up/down events along with variable thresholds for identifying the events.

In an embodiment, the confidence-interval building module 356 is in communication with the second data pre-processing module 352 and the second auto identification module 354. The confidence-interval building module 356 includes suitable logic and/or interfaces for determining upper limit confidence interval and lower limit confidence interval for each instance of each rotary cutter of the plurality of rotary cutters based on the segregated data obtained for the respective rotary cutter using a statistical technique. In parallel, the confidence-interval building module 356 is also configured to determine upper limit confidence interval and lower limit confidence interval for each instance of the rotary cutter based on the real-time rotary cutter usage data using the same statistical technique. In an embodiment, the statistical measures that may be used for determining the upper limit confidence interval and the lower limit confidence interval includes, but are not limited to, standard deviation, interquartile range (IQR) etc. In one embodiment, the confidence-interval building module 356 uses a moving window of 'n' time stamps for each rotary cutter and then determines the upper limit confidence interval and the lower limit confidence interval for that window. In an embodiment, 'n' can be any value such 10, 20, 50 etc. The confidence-interval building module 356 may also perform smoothening of the upper limit confidence interval and the lower limit confidence interval for better results using a smoothening technique.

Thereafter, the confidence-interval building module 356 is configured to create a polygon for each rotary cutter of the plurality of rotary cutters to create a library of polygons and a rotary cutter polygon for the rotary cutter using a polygon building algorithm, such as a polygon building algorithm. As the rotary cutters may have lasted different time durations due to various operation or conditional factors historically at any given pressure value, creating the library of such different rotary cutters may really be helpful in estimating the pressure change requirement of the rotary cutter being used in real-time in the machine 102. In particular, the polygon building algorithm connects the upper limit and the lower limit confidence intervals determined for each rotary cutter in time instance wise manner to obtain connected upper limit confidence intervals and connected lower limit confidence intervals for each rotary cutter of the plurality of rotary cutters and the rotary cutter present in the machine 102. Further, the confidence-interval building module 356 is configured to enclose the connected upper limit confidence intervals and the connected lower limit confidence intervals obtained for each rotary cutter to create the polygon for the respective rotary cutter. The connected upper limit confidence intervals and the connected lower limit confidence intervals obtained for the rotary cutter are enclosed to create the rotary cutter polygon for the rotary cutter.

The similarity score estimation module 358 is in communication with the confidence-interval building module 356. The similarity score estimation module 358 includes suitable logic and/or interfaces for comparing the rotary cutter polygon with each polygon present in the library of polygons to obtain a similarity score for the respective polygon. In particular, each polygon that is created from the historical data is compared with the rotary cutter polygon created using the real-time rotary cutter usage data. Further, the similarity score is calculated between the respective polygon and the rotary cutter polygon based upon similarity measure calculated and based on union and intersection of the polygon and the rotary cutter polygon, in one example embodiment. Such similarity score computation shall not be construed as limiting the scope of the present disclosure, and there could be other approaches of computing the same. So, higher the similarity score greater the similarity between the polygon and the rotary cutter polygon and hence the remaining useful life (RUL)/time to change the pressure will likely be similar to the historical rotary cutter associated with the polygon. Thus, it can be concluded that the similarity score measure is thus a quantification of 'distance' between two polygons. The higher similarity score means closer is the distance.

The similarity score estimation module 358 is further configured to select at least one polygon from the library of polygons based on the similarity score. In particular, at least one polygon that has the highest similarity score is selected by the similarity score estimation module 358. The selection criteria for the polygons can be thought as the nearest neighbour approach. The closest neighbors datasets can now be used for final estimation of time to change pressure/RUL of the rotary cutter.

In an embodiment, the time estimation module 360 is in communication with the similarity score estimation module 358. The time estimation module 360 includes suitable logic and/or interfaces for accessing the pre-processed historical data associated with the at least one selected polygon. The time estimation module 360 is further configured to estimate the time for the next pressure change based on the pre-processed historical data associated with the at least one selected polygon. Additionally, the time estimation module 360 is configured to compare the estimated time with the estimated maximum usage limit determined for the rotary cutter. If the estimated time is with the estimated maximum usage limit, the time estimation module 360 is configured to communicate the same to the continuous monitoring module 222. Otherwise, the one or more processors 206 performs the next round of calculation for estimation of time for pressure change.

Figure 4:
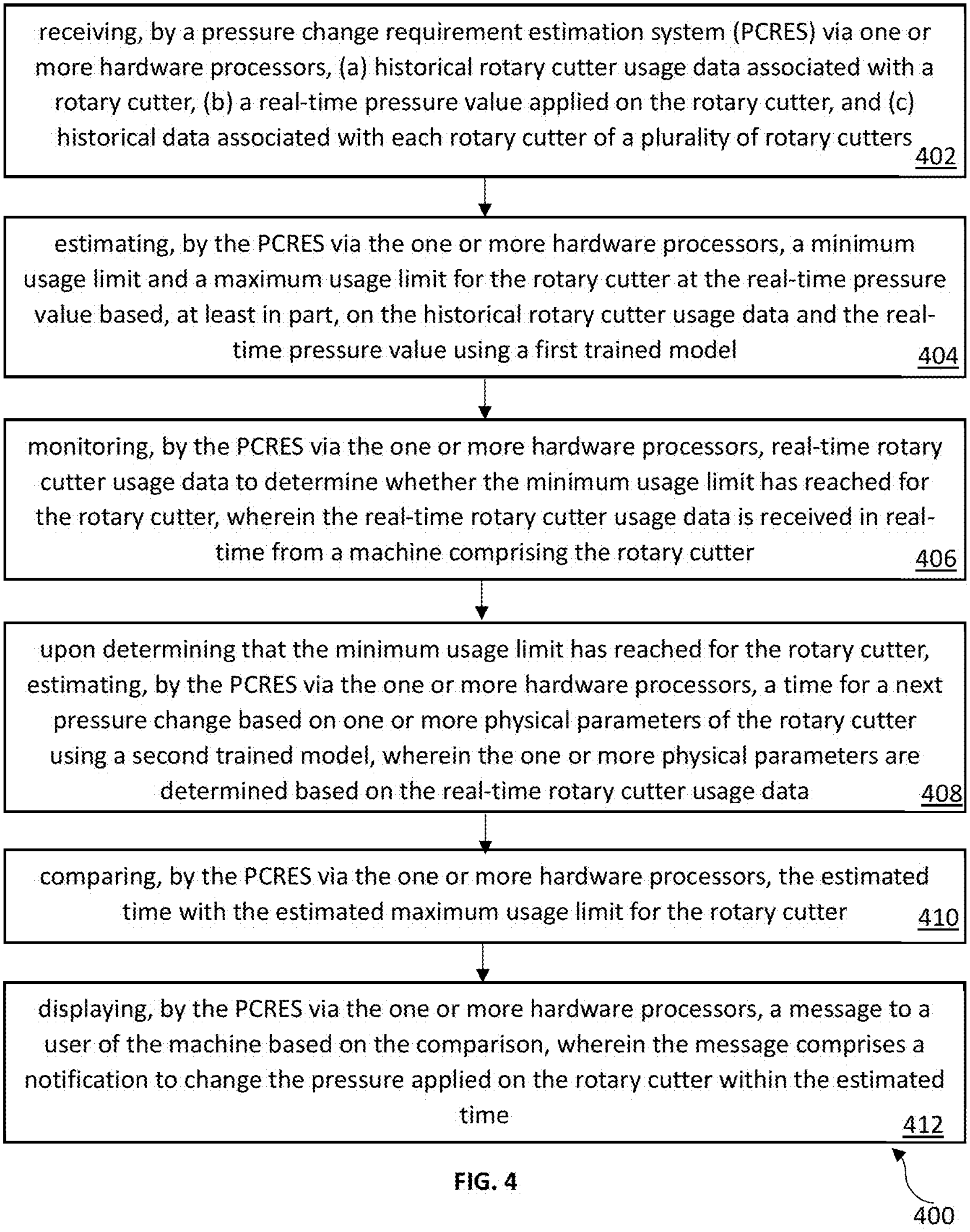
FIG. 4 illustrates an exemplary flow diagram of a method for real time estimation of pressure change requirements for rotary cutters, in accordance with an embodiment of the present disclosure.

FIG. 4, with reference to FIGS. 1, 2 and 3A-3B, illustrates an exemplary flow diagram of a method 400 for real time estimation of pressure change requirements for rotary cutters, in accordance with an embodiment of the present disclosure. The method 400 may use the system 106 of FIG. 2 and the pressure change requirement estimation system (PCRES) 106 of FIG. 1 for execution. In an embodiment, the system(s) 106 comprises one or more data storage devices or the memory 208 operatively coupled to the one or more hardware processors 206 and is configured to store instructions for execution of steps of the method 400 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method 400 of the present disclosure will now be explained with reference to the components of the system 106 as depicted in FIG. 2, and the PCRES 106 of FIG. 1.

In an embodiment of the present disclosure, at step 402, the one or more hardware processors 206 of the pressure change requirement estimation system (PCRES) 106 receive (a) historical rotary cutter usage data associated with a rotary cutter, (b) a real-time pressure value applied on the rotary cutter and (c) historical data associated with each rotary cutter of a plurality of rotary cutters. In an embodiment, the historical rotary cutter usage data includes discrete variables signifying object, such as sanitary pad quantity produced or continuous variables such as time wise pressure data, regrinding, number of times the rotary cutter is being used, manufacturer information etc.

At step 404 of the present disclosure, the one or more hardware processors 206 of the PCRES 106 estimate a minimum usage limit and a maximum usage limit for the rotary cutter at the real-time pressure value based, at least in part, on the historical rotary cutter usage data and the real-time pressure value using a first trained model.

As already explained previously, the first auto identification module 304 of the first trained model 220 automatically identifies events on which the pressure value applied to the rotary cutter is changed. The events information is further utilized by the first trained model 220 to establish a statistical range defining a minimum usage limit and a maximum usage limit of the rotary cutter at any given pressure value. Further, the first trained model 220 utilizes the statistical range to estimate the minimum usage limit and the maximum usage limit for the rotary cutter at the real-time pressure value.

At step 406 of the present disclosure, the one or more hardware processors 206 of the PCRES 106 monitor real-time rotary cutter usage data to determine whether the minimum usage limit is reached for the rotary cutter. As discussed, the continuous monitoring module 222 monitors the real-time rotary cutter usage data received in real-time from the machine 102 to determine time when the minimum usage limit is reached for the rotary cutter. As soon as the minimum usage limit is reached for the rotary cutter, step 408 is performed.

At step 408 of the present disclosure, the one or more hardware processors 206 of the PCRES 106 estimate a time for a next pressure change based on one or more physical parameters of the rotary cutter using a second trained model upon determining that the minimum usage limit is reached for the rotary cutter. In an embodiment, the one or more physical parameters are determined based on real-time rotary cutter usage data collected in real-time from the one or more sensors (present in the machine 102) defining operation related parameters such as current, speed etc. The process of estimating the time for the next pressure change using the second trained model 224 is explained in detail with reference to FIG. 3B and the description is not reiterated herein for the sake of brevity.

In an embodiment, at step 410 of the present disclosure, the one or more hardware processors 206 of the PCRES 106 compare the estimated time with the estimated maximum usage limit for the rotary cutter. Basically, the hardware processors 206 compare the estimated time with a pre-defined threshold that is the estimated maximum usage limit found for the rotary cutter to check whether the estimated time is within the pre-defined threshold. If the estimated time is found to be within the pre-defined threshold, the hardware processors 206 of the PCRES 106 performs next round of calculation for estimation of time for the next pressure change else a flag to change the rotary cutter pressure is raised (explained with respect to step 412).

At step 412 of the present disclosure, the one or more hardware processors 206 of the PCRES 106 displays a message to a user of the machine based on the comparison. If the estimated time is found to be crossing the pre-defined threshold, the flag to change the rotary cutter pressure is raised by displaying the message to the user. The message includes a notification to change the pressure applied on the rotary cutter within the estimated time.

Figure 5:
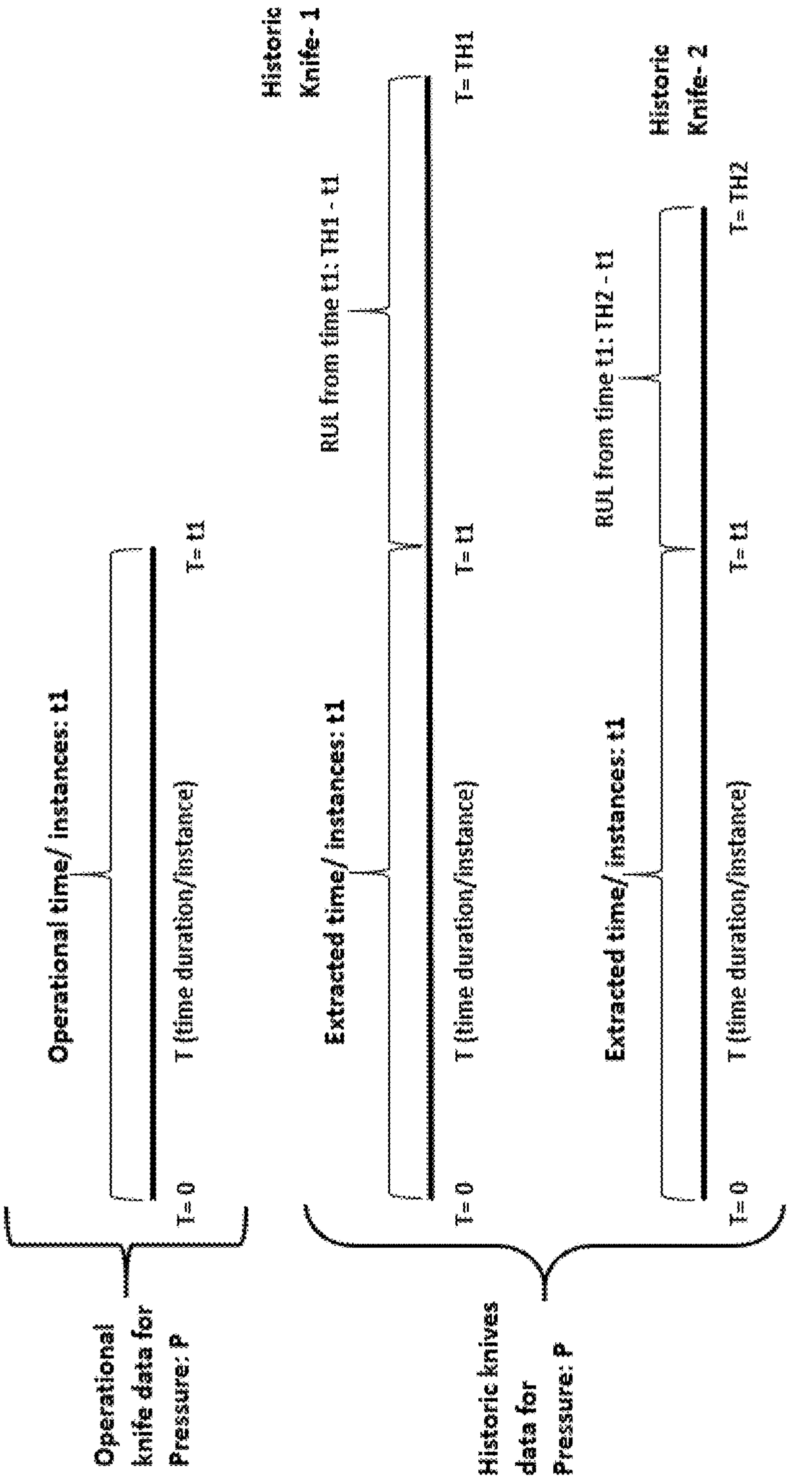
FIG. 5 illustrates an example representation of comparison of the real-time rotary cutter usage data with historical data associated with two rotary cutters for pressure change detection, in accordance with an embodiment of the present disclosure.

FIG. 5, with reference to FIGS. 1 through 4, illustrates an example representation of comparison of the real-time rotary cutter usage data with the historical data associated with two rotary cutters for pressure change detection, in accordance with an embodiment of the present disclosure.

As seen in the FIG. 5, for real-time pressure value of ‘P’, two historical profiles were available with TH1 and TH2 marking respective end of the rotary cutter life. It should be noted that the TH1 represents the time for historic knife ‘1’ and TH1 represents the time for historic knife ‘2’. The rotary cutter can be seen at operating at time “t1” when the second trained model 224 is triggered. The real-time rotary cutter usage data for operational rotary cutter till time t1 is extracted and further compared with historical rotary cutters and based on the highest similarity between the usage data, the time for the next pressure change is estimated for the operational rotary cutter based on TH1 and TH2.

Figure 6:
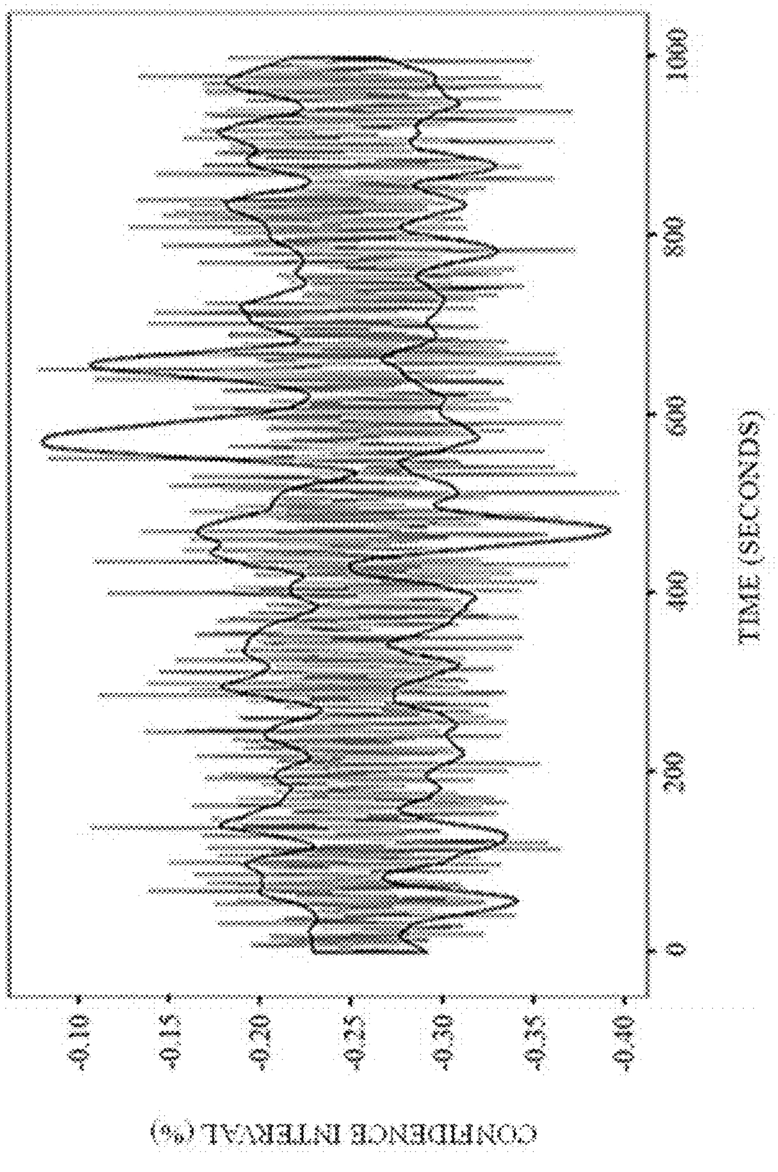
FIG. 6 illustrates an example graphical representation of a polygon created for the rotary cutter, in accordance with an embodiment of the present disclosure.

FIG. 6, with reference to FIGS. 1 through 5, illustrates an example graphical representation of a polygon created for a rotary cutter, in accordance with an embodiment of the present disclosure.

As seen in the FIG. 6, the graphical representation of the polygon shows that the upper limit confidence intervals and the lower limit confidence intervals that are obtained for the rotary cutter are enclosed and connected to create the polygon for the rotary cutter.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, rotary cutters tend to lose material and sharpness over their usage cycle. So, to make it work for a longer time, a cylinder is used to impart a vertical force. The pressure that is to be applied to a rotary cutter is changed manually by an operator based on his/her experience. Most of the times, the pressure change is applied once the machine stops automatically as the rotary cutter cannot execute the cutting operation, thereby leading to wastage of operational time as well as the material which has to be discarded. Moreover, because of inefficient utilization of the rotary cutter, the rotary cutter loses its cutting property early that further leads to increase in cost as the rotary cutter needs to be changed frequently for proper functioning of the machine. To overcome these disadvantages, embodiments of the present disclosure provide methods and systems for real time estimation of pressure change requirements for rotary cutters. More specifically, the system identifies pressure change requirement while considering both time of usage as well as physics-based signals. Once the pressure change requirement is identified, the system automatically verifies and calculates the exact pressure change requirement, thereby guiding the system to automatically update the pressure applied on the rotary cutters in real-time. Basically, the system automatically predicts the next rotary cutter pressure change time based on historical rotary cutter usage data and physical parameters of the rotary cutter and alerts a user/operator of the machine to change the pressure when it is due, thereby mitigating the need for human judgement that further helps in ensuring optimal utilization of the rotary cutters and higher productivity while reducing the wastage of the operational time and the material.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for estimating pressure change requirements for a rotary cutter, comprising:

receiving, by a pressure change requirement estimation system (PCRES) via one or more hardware processors, (a) historical rotary cutter usage data associated with the rotary cutter, (b) a real-time pressure value applied on the rotary cutter, and (c) historical data associated with each rotary cutter of a plurality of rotary cutters, wherein the historical rotary cutter usage data comprise discrete variables: regrinding information, number of times the rotary cutter been used, a manufacturer information;

estimating, by the PCRES via the one or more hardware processors, a minimum usage limit and a maximum usage limit for the rotary cutter at the real-time pressure value based on the historical rotary cutter usage data and the real-time pressure value using a first trained model;

monitoring, by the PCRES via the one or more hardware processors, real-time rotary cutter usage data to determine whether the minimum usage limit has reached for the rotary cutter, wherein the real-time rotary cutter usage data is received in real-time from a machine comprising the rotary cutter, wherein the real-time rotary cutter usage data is collected in a real-time from one or more sensors that are installed in the machine, wherein the one or more sensors collects one or more physical parameters: current and speed;

upon determining that the minimum usage limit has been reached for the rotary cutter, estimating, by the PCRES via the one or more hardware processors, a time for a next pressure change in accordance with the one or more physical parameters including the current and the speed of the rotary cutter using a second trained model, wherein the one or more physical parameters are determined based on the real-time rotary cutter usage data, wherein estimating the time for the next pressure change in accordance with the one or more physical parameters of the rotary cutter using the second trained model comprises:

pre-processing, by the PCRES via the one or more hardware processors, the historical data associated with each rotary cutter to obtain pre-processed historical data for the rotary cutter, wherein the historical data facilitates to understand underlying trends signifying loss of cutting property of each rotary cutter of the plurality of rotary cutters, requiring change in pressure;

automatically identifying, by the PCRES via the one or more hardware processors, events corresponding to change in the pressure;

extracting, by the PCRES via the one or more hardware processors, historical data of every equi-pressure window separately; and performing, by the PCRES via the one or more hardware processors, pressure wise segregation of the pre-processed historical data for a complete cycle of each rotary cutter with respect to multi-pressure values to obtain segregated data for the rotary cutter;

comparing, by the PCRES via the one or more hardware processors, the estimated time for the next pressure change with the estimated maximum usage limit for the rotary cutter;

identifying, by the PCRES via the one or more hardware processors, pressure change requirement in accordance with a time of usage and the one or more physical parameters;

automatically verifying and calculating, by the PCRES via the one or more hardware processors, an actual pressure change requirement, thereby guiding a pressure change requirement estimation system to automatically update the pressure applied on the rotary cutter in real-time, upon identifying the pressure change requirement;

displaying, by the PCRES via the one or more hardware processors, a message through an alert to a user of the machine based on the comparison, wherein when the estimated time for the next pressure change is identified to be crossing a pre-defined threshold, a flag to change the rotary cutter pressure is raised, wherein the message comprises a notification to change the pressure applied on the rotary cutter within the estimated time for the next pressure change;

transmitting, by the PCRES via the one or more hardware processors, one or more control signals to one or more actuators installed in the machine to automatically update the pressure applied to the rotary cutter to the computed next pressure; and modifying, by the PCRES via the one or more hardware processors, a mechanical pressure exerted by a cylinder on the rotary cutter during operation, in accordance with the computed next pressure.

2. The method for estimating pressure change requirements for the rotary cutter of claim 1, wherein estimating, by the PCRES via the one or more hardware processors, the minimum usage limit and the maximum usage limit for the rotary cutter at the real-time pressure value based on the historical rotary cutter usage data and the real-time pressure value using the first trained model comprises:

identifying, by the PCRES via the one or more hardware processors, one or more events on which a pressure applied to the rotary cutter is changed based on the historical rotary cutter usage data, wherein each event of the one or more events is associated with a pressure value;

defining, by the PCRES via the one or more hardware processors, usage of the rotary cutter for each event of the one or more events, wherein the usage of an event includes time details for which the rotary cutter is working at a respective pressure value;

generating, by the PCRES via the one or more hardware processors, a statistical range defining a minimum limit and a maximum limit of the usage of the rotary cutter at each event of the one or more events; and estimating, by the PCRES via the one or more hardware processors, the minimum usage limit and the maximum usage limit for the rotary cutter at the real-time pressure value based on the statistical range and the real-time pressure value.

3. The method for estimating pressure change requirements for the rotary cutter of claim 1, wherein performing the pressure wise segregation of the pre-processed historical data is followed by:

determining, by the PCRES via the one or more hardware processors, upper limit confidence interval and lower limit confidence interval for each instance of each rotary cutter of the plurality of rotary cutters based on the segregated data obtained for the rotary cutter, and for each instance of the rotary cutter based on the real-time rotary cutter usage data using a statistical technique;

creating, by the PCRES via the one or more hardware processors, a polygon for each rotary cutter of the plurality of rotary cutters to create a library of polygons and a rotary cutter polygon for the rotary cutter using a polygon building algorithm, wherein the polygon for each rotary cutter of the plurality of rotary cutters and the rotary cutter is created based on the upper limit confidence interval and the lower limit confidence interval determined for the rotary cutter;

comparing, by the PCRES via the one or more hardware processors, the rotary cutter polygon with each polygon present in the library of polygons to obtain a similarity score for the respective polygon;

selecting, by the PCRES via the one or more hardware processors, at least one polygon from the library of polygons based on the similarity score;

accessing, the PCRES via the one or more hardware processors, the pre-processed historical data associated with the at least one selected polygon; and estimating, by the PCRES via one or more hardware processors, the time for the next pressure change based on the pre-processed historical data associated with the at least one selected polygon.

4. The method for estimating pressure change requirements for the rotary cutter of claim 3, wherein creating, by the PCRES via the one or more hardware processors, the polygon for each rotary cutter of the plurality of rotary cutters to create the library of polygons using a polygon building algorithm comprises:

connecting, by the PCRES via the one or more hardware processors, the upper limit confidence interval and the lower limit confidence interval determined for each rotary cutter in time instance wise manner to obtain one or more connected upper limit confidence intervals and one or more connected lower limit confidence intervals for each rotary cutter; and enclosing, by the PCRES via the one or more hardware processors, the one or more connected upper limit confidence intervals and the one or more connected lower limit confidence intervals obtained for each rotary cutter to create the polygon for rotary cutter.

5. A pressure change requirement estimation system, comprising:

a memory storing instructions;

one or more communication interfaces; and one or more hardware processors coupled to the memory via the one or more communication interfaces, wherein the one or more hardware processors are configured by the instructions to:

receive (a) historical rotary cutter usage data associated with a rotary cutter, (b) a real-time pressure value applied on the rotary cutter and (c) historical data associated with each rotary cutter of a plurality of rotary cutters, wherein the historical rotary cutter usage data comprise discrete variables: regrinding information, number of times the rotary cutter been used, a manufacturer information;

estimate a minimum usage limit and a maximum usage limit for the rotary cutter at the real-time pressure value based on the historical rotary cutter usage data and the real-time pressure value using a first trained model;

monitor real-time rotary cutter usage data to determine whether the minimum usage limit has reached for the rotary cutter, wherein the real-time rotary cutter usage data is received in real-time from a machine comprising the rotary cutter, wherein the real-time rotary cutter usage data is collected in a real-time from one or more sensors that are installed in the machine, wherein the one or more sensors collects one or more physical parameters: current and speed;

upon determining that the minimum usage limit has been reached for the rotary cutter, estimate a time for a next pressure change in accordance with the one or more physical parameters including the current and the speed of the rotary cutter using a second trained model, wherein the one or more physical parameters are determined based on the real-time rotary cutter usage data, wherein to estimate the time for the next pressure change based on one or more physical parameters of the rotary cutter using the second trained model, the system is further caused to:

pre-process the historical data associated with each rotary cutter to obtain pre-processed historical data for the rotary cutter, wherein the historical data facilitates to understand underlying trends signifying loss of cutting property of each rotary cutter of the plurality of rotary cutters, requiring change in pressure;

automatically identify events corresponding to change in the pressure; extract historical data of every equi-pressure window separately; and perform pressure wise segregation of the pre-processed historical data for a complete cycle of each rotary cutter with respect to multi-pressure values to obtain segregated data for the rotary cutter;

compare the estimated time for the next pressure change with the estimated maximum usage limit for the rotary cutter;

identify pressure change requirement in accordance with a time of usage and the one or more physical parameters;

automatically verify and calculate an actual pressure change requirement, thereby guiding a pressure change requirement estimation system to automatically update the pressure applied on the rotary cutter in real-time, upon identifying the pressure change requirement;

display a message through an alert to a user of the machine based on the comparison, wherein when the estimated time for the next pressure change is identified to be crossing a pre-defined threshold, a flag to change the rotary cutter pressure is raised, wherein the message comprises a notification to change the pressure applied on the rotary cutter within the estimated time for the next pressure change;

transmit one or more control signals to one or more actuators installed in the machine to automatically update the pressure applied to the rotary cutter to the computed next pressure; and modify a mechanical pressure exerted by a cylinder on the rotary cutter during operation, in accordance with the computed next pressure.

6. The pressure change requirement estimation system as claimed in claim 5, wherein to estimate the minimum usage limit and the maximum usage limit for the rotary cutter at the real-time pressure value based on the historical rotary cutter usage data and the real-time pressure value using a first trained model, the system is further caused to:

identify one or more events on which a pressure applied to the rotary cutter is changed based on the historical rotary cutter usage data, wherein each event of the one or more events is associated with a pressure value;

define usage of the rotary cutter for each event of the one or more events, wherein the usage of an event includes time details for which the rotary cutter is working at a respective pressure value;

generate a statistical range defining a minimum limit and a maximum limit of the usage of the rotary cutter at each event of the one or more events; and estimate the minimum usage limit and the maximum usage limit for the rotary cutter at the real-time pressure value based on the statistical range and the real-time pressure value.

7. The pressure change requirement estimation system as claimed in claim 5, wherein perform the pressure wise segregation of the pre-processed historical data is followed to:

determine upper limit confidence interval and lower limit confidence interval for each instance of each rotary cutter of the plurality of rotary cutters based on the segregated data obtained for the rotary cutter, and for each instance of the rotary cutter based on the real-time rotary cutter usage data using a statistical technique;

create a polygon for each rotary cutter of the plurality of rotary cutters to create a library of polygons and a rotary cutter polygon for the rotary cutter using a polygon building algorithm, wherein the polygon for each rotary cutter of the plurality of rotary cutters and the rotary cutter is created based on the upper limit confidence interval and the lower limit confidence interval determined for the rotary cutter;

compare the rotary cutter polygon with each polygon present in the library of polygons to obtain a similarity score for the respective polygon;

select at least one polygon from the library of polygons based on the similarity score;

access the pre-processed historical data associated with the at least one selected polygon; and estimate the time for the next pressure change based on the pre-processed historical data associated with the at least one selected polygon.

8. The pressure change requirement estimation system as claimed in claim 7, wherein to create the polygon for each rotary cutter of the plurality of rotary cutters to create the library of polygons using the polygon building algorithm, the system is further caused to:

connect the upper limit confidence interval and the lower limit confidence interval determined for each rotary cutter in time instance wise manner to obtain one or more connected upper limit confidence intervals and one or more connected lower limit confidence intervals for each rotary cutter; and enclose the one or more connected upper limit confidence intervals and the one or more connected lower limit confidence intervals obtained for each rotary cutter to create the polygon for rotary cutter.

9. One or more non-transitory machine-readable information storage mediums comprising one or more instructions which when executed by one or more hardware processors cause:

receiving, by a pressure change requirement estimation system (PCRES) (a) historical rotary cutter usage data associated with a rotary cutter, (b) a real-time pressure value applied on the rotary cutter, and (c) historical data associated with each rotary cutter of a plurality of rotary cutters, wherein the historical rotary cutter usage data comprise discrete variables: regrinding information, number of times the rotary cutter been used, a manufacturer information;

estimating, by the PCRES, a minimum usage limit and a maximum usage limit for the rotary cutter at the real-time pressure value based on the historical rotary cutter usage data and the real-time pressure value using a first trained model;

monitoring, by the PCRES, real-time rotary cutter usage data to determine whether the minimum usage limit has reached for the rotary cutter, wherein the real-time rotary cutter usage data is received in real-time from a machine comprising the rotary cutter, wherein the real-time rotary cutter usage data is collected in a real-time from one or more sensors that are installed in the machine, wherein the one or more sensors collects one or more physical parameters current and speed;

upon determining that the minimum usage limit has been reached for the rotary cutter, estimating, by the PCRES, a time for a next pressure change in accordance with the one or more physical parameters including the current and the speed of the rotary cutter using a second trained model, wherein the one or more physical parameters are determined based on the real-time rotary cutter usage data, wherein estimating the time for the next pressure change in accordance with the one or more physical parameters of the rotary cutter using the second trained model comprises:

pre-processing, by the PCRES, the historical data associated with each rotary cutter to obtain pre-processed historical data for the rotary cutter, wherein the historical data facilitates to understand underlying trends signifying loss of cutting property of each rotary cutter of the plurality of rotary cutters, requiring change in pressure;

automatically identifying, by the PCRES, events corresponding to change in the pressure;

extracting, by the PCRES, historical data of every equi-pressure window separately; and performing, by the PCRES, pressure wise segregation of the pre-processed historical data for a complete cycle of each rotary cutter with respect to multi-pressure values to obtain segregated data for the rotary cutter;

comparing, by the PCRES, the estimated time for the next pressure change with the estimated maximum usage limit for the rotary cutter;

identifying, by the PCRES, pressure change requirement in accordance with a time of usage and the one or more physical parameters;

automatically verifying and calculating, by the PCRES, an actual pressure change requirement, thereby guiding a pressure change requirement estimation system to automatically update the pressure applied on the rotary cutter in real-time, upon identifying the pressure change requirement;

displaying, by the PCRES, a message through an alert to a user of the machine based on the comparison, wherein when the estimated time for the next pressure change is identified to be crossing a pre-defined threshold, a flag to change the rotary cutter pressure is raised, wherein the message comprises a notification to change the pressure applied on the rotary cutter within the estimated time for the next pressure change;

transmitting, by the PCRES, one or more control signals to one or more actuators installed in the machine to automatically update the pressure applied to the rotary cutter to the computed next pressure; and modifying, by the PCRES, a mechanical pressure exerted by a cylinder on the rotary cutter during operation, in accordance with the computed next pressure.

10. The one or more non-transitory machine-readable information storage mediums of claim 9, wherein estimating, by the PCRES via the one or more hardware processors, the minimum usage limit and the maximum usage limit for the rotary cutter at the real-time pressure value based on the historical rotary cutter usage data and the real-time pressure value using the first trained model comprises:

identifying, by the PCRES, one or more events on which a pressure applied to the rotary cutter is changed based on the historical rotary cutter usage data, wherein each event of the one or more events is associated with a pressure value;

defining, by the PCRES, usage of the rotary cutter for each event of the one or more events, wherein the usage of an event includes time details for which the rotary cutter is working at a respective pressure value;

generating, by the PCRES, a statistical range defining a minimum limit and a maximum limit of the usage of the rotary cutter at each event of the one or more events; and estimating, by the PCRES, the minimum usage limit and the maximum usage limit for the rotary cutter at the real-time pressure value based on the statistical range and the real-time pressure value.

11. The one or more non-transitory machine-readable information storage mediums of claim 9, wherein performing the pressure wise segregation of the pre-processed historical data is followed by:

determining, by the PCRES, upper limit confidence interval and lower limit confidence interval for each instance of each rotary cutter of the plurality of rotary cutters based on the segregated data obtained for the rotary cutter, and for each instance of the rotary cutter based on the real-time rotary cutter usage data using a statistical technique;

creating, by the PCRES, a polygon for each rotary cutter of the plurality of rotary cutters to create a library of polygons and a rotary cutter polygon for the rotary cutter using a polygon building algorithm, wherein the polygon for each rotary cutter of the plurality of rotary cutters and the rotary cutter is created based on the upper limit confidence interval and the lower limit confidence interval determined for the rotary cutter;

comparing, by the PCRES, the rotary cutter polygon with each polygon present in the library of polygons to obtain a similarity score for the respective polygon;

selecting, by the PCRES, at least one polygon from the library of polygons based on the similarity score;

accessing, the PCRES, the pre-processed historical data associated with the at least one selected polygon; and estimating, by the PCRES the time for the next pressure change based on the pre-processed historical data associated with the at least one selected polygon.

12. The one or more non-transitory machine-readable information storage mediums of claim 11, wherein creating, by the PCRES via the one or more hardware processors, the polygon for each rotary cutter of the plurality of rotary cutters to create the library of polygons using a polygon building algorithm comprises:

connecting, by the PCRES, the upper limit confidence interval and the lower limit confidence interval determined for each rotary cutter in time instance wise manner to obtain one or more connected upper limit confidence intervals and one or more connected lower limit confidence intervals for each rotary cutter; and enclosing, by the PCRES, the one or more connected upper limit confidence intervals and the one or more connected lower limit confidence intervals obtained for each rotary cutter to create the polygon for rotary cutter.

* * * * *